Patented Jan. 19, 1926.

1,570,005

UNITED STATES PATENT OFFICE.

HERMAN REINBOLD AND HUGO REINBOLD, OF OMAHA, NEBRASKA; SAID HUGO REIN-
BOLD ASSIGNOR TO SAID HERMAN REINBOLD.

MEDIUM FOR BLEACHING, CRACKING, AND DESULPHURIZING PETROLEUM AND
OTHER HYDROCARBON COMPOUNDS AND PROCESS OF PREPARING SAME.

No Drawing.    Application filed January 21, 1924.   Serial No. 687,654.

*To all whom it may concern:*

Be it known that we HERMAN REINBOLD and HUGO REINBOLD, both citizens of the United States of America, residing at Omaha, in the county of Douglas and State of Nebraska, have invented certain new and useful Improvements in Mediums for Bleaching, Cracking, and Desulphurizing Petroleum and Other Hydrocarbon Compounds and Processes of Preparing Same, of which the following is a specification.

This invention relates to the use of clay, especially a colloid clay of the bentonite type, as a medium for refining and distilling oils and to the processes of preparing and using the same.

The use of anhydrous aluminum chloride has been practised in the refining of petroleum and other oils. The high cost and limited supply thereof, has, however, made its general use impractical.

The objects of the present invention are:

To provide a source of supply for the aluminum chloride;

To provide a highly porous, active substance or base in which the aluminum chloride is held in colloidal dispersion so as to present a maximum active surface for reaction on the hydro-carbons;

To provide in addition to the porous base and aluminum chloride an additional catalyst which will raise the volatilizing temperature of the aluminum chloride so that oils, such as shale oils and high asphalt content oils, which are volatile only at temperatures above that of aluminum chloride may be treated;

To provide a porous colloidal base for either or both the aluminum chloride and the additional catalyst which will in itself be an active agent in the oil refining process.

Other objects and advantages will become apparent in the preparation of the product and in its use as an oil treating medium and it is desired to be understood that all such objects and advantages are anticipated and within the spirit of this invention.

The invention will be described as pertaining to bentonite but it is, of course, not limited only to bentonite, it being equally applicable to all colloidal or plastic alumino-silicates or any other clays which are chemically complex, alumino-silicates altered by infiltration or other causes, due to the geological conditions under which they were formed. The process is also applicable to all solid alumino-silicates which are capable of being converted into the hydrous variety by chemical treatment.

Our new oil treating compound or medium is prepared for use by the following steps:

(*a*) Grinding. The clay is ground to size varying from 4 to 7 mesh.

(*b*) Wetting. The ground bentonite is soaked in water sufficient only to penetrate all of the pores of the mineral without forming a "jelly." Bentonite (as explained in our co-pending application Serial No. 669,306, filed Oct. 18, 1923) is a very colloidal clay and has the property of swelling to a jelly-like mass of greatly increased volume upon the addition of water. Therefore, in this step care must be taken to add only enough water to fill the pores without causing it to "jelly" and destroy its original structure and shape.

The water is added for the purpose of reducing the concentration of the hydrochloric acid and preventing the destruction of the structure of the clay by too rapid and violent action.

(*c*) Chlorination. Approximately 90 per cent of concentrated hydrochloric acid (HCl) is slowly and gradually added to the wet mineral while it is being stirred and agitated. Because of the greater solubility of the hydrochloric acid at a low temperature this step is carried on at ordinary room temperature. The mixture is now allowed to stand for from 10 to 12 hours. Bentonite is an hydrated aluminum-silicate containing, in its natural state from 20 to 25 per cent alumina, some infiltrated impurities such as lime, magnesia, iron etc., and a small percentage of alkalies. These impurities and alkalies have no harmful effect on the compound, however. In this step, aluminum chloride ($Al_2Cl_6$) is formed by the aluminum of the bentonite and the chlorine of the hydrochloric acid, and hydrous silicic acid is formed by the splitting of the silica from the bentonite or aluminum silicate. During the setting period the aluminum chloride is adsorbed by the hydrous silicic acid and held in colloidal and molecular dispersion through peptization retaining the original bentonite structure.

In this highly dispersed and highly active condition it presents a maximum surface to the oils being treated.

Should the compound be intended for use on shale oils or other oils or fractionations having a high boiling point, lithium carbonate (or chloride) is gradually added to the mixture after the addition of the hydrochloric acid.

If the carbonate is used, the lithia forms, in combination with the hydrochloric acid, lithium chloride (LiCl) which is volatile only at temperatures above 600° C., while aluminum chloride, under ordinary conditions, volatilizes at about 183° C. The lithium chloride, however, has further beneficial properties on the compound in that we have found it to be an excellent catalyst, even more active than the aluminum chloride, either alone or in the mixture described, and it, therefore, greatly assists the action of the colloid compound. As little as 2 per cent lithium chloride has been found to be effectual in raising the volatilizing point of the aluminum chloride. In addition to the effect on the chemical properties, we have found that the addition of a small percentage of lithium greatly increases the colloidal properties of the clay. Hydrogen chloride gas can, of course, be substituted in this step for the solution of hydrochloric acid.

(d) De-watering. The mixture is very gradually and carefully heated to a temperature of approximately 300° C. The heating should be continued until all of the mechanically contained water has been driven off and all except from 3 to 5 per cent of the water of constitution has been removed from the colloidal compound. Further heating would result in driving out the hydrochloric acid and forming inactive aluminum silicate and in breaking down the structure of, and deactivating the hydrous silicic acid. It is therefore absolutely essential that a small percentage of the water of constitution remain in the compound.

If the above described process has been carried out successfully, the resulting product is a highly porous, colloidal substance which consists of a peptized or loosely chemically-combined, or colloidally and molecularly dispersed, aluminum chloride with a hydrous silicic acid in the form of a solid gel. No aluminum chloride has been volatilized and the material should be nearly neutral and only slightly soluble.

When the above prepared compound, in granular or pulverized form, is mixed with crude petroleum or its fractionations, in the liquid phase, and then boiled and distilled, or if the oil is passed in the vapor phase through the compound, it will, like anhydrous aluminum chloride, not only "crack" or transform the unsaturated hydrocarbons into saturated hydro-carbons, but will according to the constitution of the crude oil and the temperature at which it is distilled, decompose them from the heavier hydro-carbons into the lighter hydro-carbons and at the same time will decolorize and desulphurize the product.

The most effective method of treating the oils with the improved treating medium has been found to pass the hydro-carbon vapors through a bed of the compound at the proper temperature for the fractionations desired and at atmospheric pressure.

The above noted results in the use of the compound on the crude oils appear to be not only due to the well known action of the aluminum chloride but also to the action of the hydrous silicic acid, which is loosely combined with the aluminum chloride. The hydrous silicic acid acts as a catalyst and assists the action of the aluminum chloride and the lithium chloride and since it has great adsorption properties for vapors and gases, it probably acts as a contact substance releasing the sulphur from the oil.

The action of the lithia in raising the volatilizing temperature of the aluminum chloride may be explained by ionization.

Before the mineral is used, it may be activated by subjecting it to current of warm air to remove hydroscopically contained water as a safeguard in case the mineral may have been exposed to moisture.

While we have described in some detail a preferred method of preparing our medium and of carrying out our process, together with the theories which we believe best explain the success of the process, it is understood that our invention is not limited to the precise procedure described nor is it dependent upon the accuracy of the theories which we have advanced. On the contrary, our invention is not to be regarded as limited except in so far as such limitations are included within the terms of the accompanying claims, in which it is our intention to claim all novelty inherent in our invention as broadly as is permissible in view of the prior art.

Having thus described our invention, what we claim and desire secured by Letters Patent is:—

1. The use of hydrous silicic acid in combination with aluminum chloride as an oil treating medium.

2. The use of hydrous silicic acid in combination with a metal chloride as an oil treating medium.

3. The use of a medium for the refining and distilling of oils which has been prepared by the treating of an alumino-silicate clay with hydrogen chloride gas.

4. The process of preparing a medium for the refining and distilling of oils comprising: the treating of a natural uncalcined aluminum silicate with hydrochloric-acid to substantially the saturation point whereby the aluminum silicate is split into aluminum chloride and hydrous silicic acid mechanically combined in colloidal and molecular dispersion in the form of a solid jelly retaining its original structure.

5. The process of preparing a medium for the refining and distilling of oils comprising: grinding a clay; adding sufficient water to the ground clay to fill the pores thereof; adding hydrochloric acid to the wet clay; and subsequently removing a portion of the water from the clay.

6. The process of preparing a medium for the refining and distilling of oils comprising: grinding a clay; adding sufficient water to the ground clay to fill the pores thereof; adding hydrogen chloride gas to the wet clay; and subsequently removing a portion of the water from the clay.

7. The process of preparing a medium for the refining and distilling of oils comprising: the treating of a natural uncalcined aluminum silicate with hydrochloric-acid gas, to substantially the saturation point whereby the aluminum silicate is split into aluminum chloride and hydrous silicic acid mechanically combined in colloidal and molecular dispersion in the form of a solid jelly retaining its original structure.

8. The step in a process of preparing a medium for use in the refining and distilling of oils comprising the treatment with hydrogen chloride gas of an alumino-silicate, which is capable of being converted into the hydrous variety.

9. An oil treating medium comprising, in combination, hydrous silicic acid and aluminum chloride.

10. An oil treating medium comprising hydrous silicic acid and aluminum chloride in mechanical combination.

11. An oil treating medium comprising aluminum chloride and hydrous silicic acid mechanically combined in colloidal and molecular dispersion in the form of a solid jelly.

12. The process of preparing a medium for the refining and distilling of oils comprising: the adding of hydrochloric acid to natural, uncalcined, bentonite so as to form aluminum chloride and hydrous silicic acid and allowing the resultant product to age so that the aluminum chloride will be adsorbed by the hydrous silicic acid and subsequently removing a portion of the contained moisture.

13. An oil treating medium comprising colloidally dispersed aluminum chloride.

14. An oil treating medium comprising colloidally dispersed aluminum chloride and hydrous silicic acid.

In testimony whereof, we affix our signatures.

HERMAN REINBOLD.
HUGO REINBOLD.